A. ZIEVE & H. DAVIDOVITZ.
AUTOMOBILE TIRE TRUNK.
APPLICATION FILED DEC. 12, 1910.
1,074,079.
Patented Sept. 23, 1913.
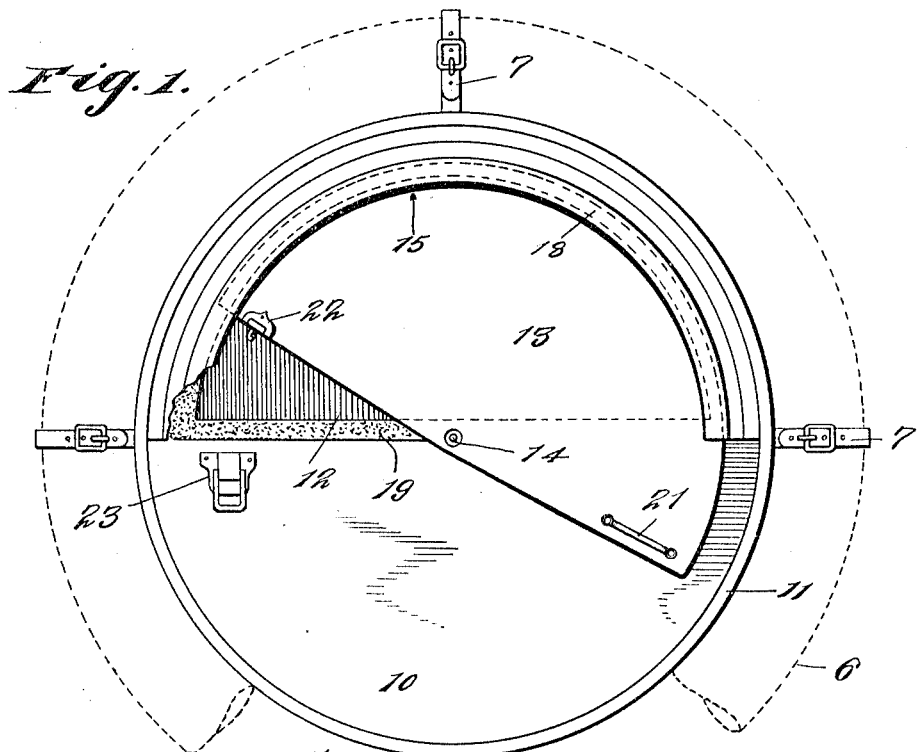
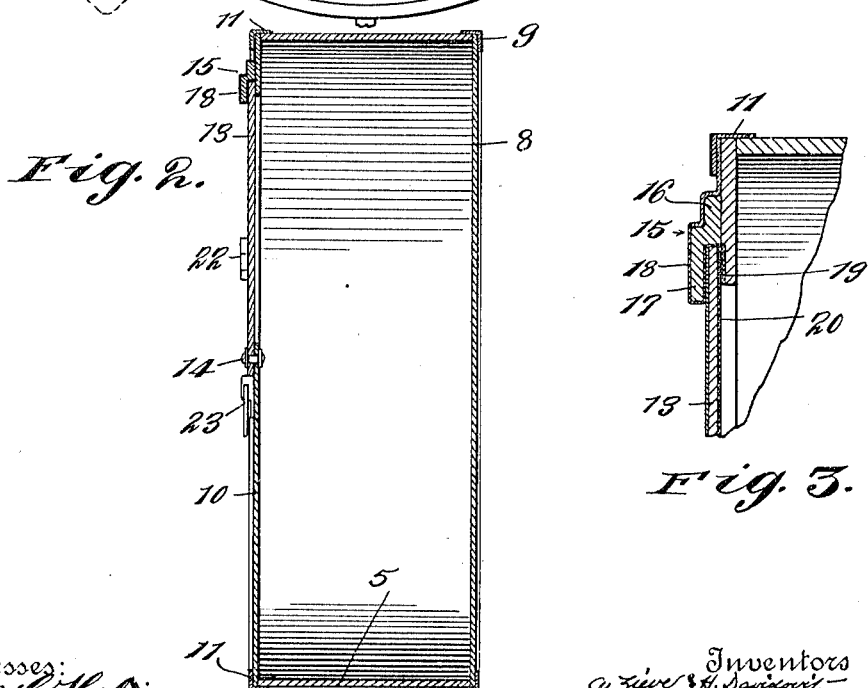

UNITED STATES PATENT OFFICE.

ABRAHAM ZIEVE AND HARRY DAVIDOVITZ, OF NEW YORK, N. Y.

AUTOMOBILE TIRE-TRUNK.

1,074,079.

Specification of Letters Patent.

Patented Sept. 23, 1913.

Application filed December 12, 1910. Serial No. 596,887.

*To all whom it may concern:*

Be it known that we, ABRAHAM ZIEVE and HARRY DAVIDOVITZ, subjects of the Czar of Russia, residing in the city of New York, borough of Brooklyn, county of Kings, and State of New York, and in the borough of Manhattan, county and State of New York, respectively, have invented certain new and useful Improvements in Automobile Tire-Trunks, of which the following is a full, clear, and exact specification.

This invention relates to and has for an object to provide an improved device of the character which is generally known in the automobile trade as a tire trunk, the object of the invention being to provide a trunk of simple construction and neat appearance, provided with a dustproof and waterproof closure.

In the drawings accompanying and forming a part of this specification, one embodiment of our invention is illustrated, in which drawings—

Figure 1 represents a front view of the trunk partly broken away. Fig. 2 is a longitudinal vertical section thereof; and Fig. 3 is an enlarged detail of the joint between the closure and the head which carries the same, together with its housing or guide.

In the trunk illustrated herein, the body-portion 5, is shown substantially cylindrical for fitting within the extra tire shown by dotted lines at 6, carried by an automobile, and to which tire the trunk will be secured by some suitable means. Straps 7, are shown herein for holding the trunk in position within the tire.

The rear of the body-portion of the trunk is shown closed by a head 8. The head will be held in position by some suitable means. In the illustration the flat, inner face of the head engages the rear edge. A binding-strip 9, secured to the head and the body-portion, holds the head in position against the body-portion. The front of the body-portion of the trunk is shown closed by a head 10. The inner, flat face of the head 10 is engaged by the front edge of the body-portion. This head is shown held in position by means of a binding-strip 11, secured to the head and to the body.

The front head 10 is provided with an opening 12, through which the interior of the trunk may be reached. In the present showing such opening is substantially semi-circular and its upper edge is an arc of a circle having the center of the head as its center. The opening 12 herein illustrated is shown so disposed relative to the body of the head 10 that the circumferential outline of the head remains intact and a substantial amount of the material of the head will lie radially outward of the opening.

The closure 13, for the opening 12 is, in the present showing, of semi-circular form and sufficiently large to overlie the flat face of the head 10 when the closure is in its closed position. The closure 13 is shown pivoted at 14 to the center of the head 10. Its outer edge is shown as the arc of a circle having such center and pivot as its center, the radius of the arc of the closure being greater than the radius of the arc of the opening. The circular edge of the closure will overlie the portion between the circular edge of the opening and the circumference of the head.

A housing in the nature of a guide 15, is provided for the edge of the closure. This member, constituting a housing and guide, is for the purpose of guiding the outer edge of the closure while this is moving toward or from its closed position, and for affording a waterproof and dustproof housing for the edge of the closure when in its closed position.

The trunk, when in use, will preferably occupy substantially the position illustrated in Fig. 1; that is with the center of the arch of the opening 12 uppermost and the head 10 in substantially a vertical plane.

The body-portion of the trunk, its heads and the closure, will in practice generally be covered outwardly with some waterproof material.

The member 15 is shown as comprising a strip angularly bent in a longitudinal direction to form a flat outer attaching flange 16 and an inner offset guiding flange 17, the attaching flange being fitted flat against and secured to the arcuate integral portion of the head extending between the circular edge of the opening and the periphery of the head; and the inner guiding flange being arranged in spaced relation with the inner part of the said integral arcuate portion of the head, and forming therewith a guiding groove located at the curved edge of the said portion. Waterproof material 18, is shown lining the inner or rearward face of the portion 17 and extending over the outside of this portion and the portion 16, and extending to the outer perimeter of the head 10, at which point it will be engaged by the binding-member 11. The edge of such waterproof material being covered by the binding-strip, will make not only a neat, but a water-tight joint on the outside. The presence of this material on the inside will present a smooth anti-frictional surface for the outer surface of the closure. Material impervious to water at the juncture of this housing and the closure will prevent access of water.

A strip of some suitable dust-stopping material 19, is shown surrounding the edges of the opening 12; that is, this material occupies a position on the outer face of the head 10 adjacent the edges of the opening. The inner face of the closure 13 is provided with similar material 20 for coöperation with the material 19. Felt is a good material of which to make these faces 19 and 20. When the closure is in a closed position, water will be prevented from finding access to the joint between the upper edge of the closure and the upper edge of the opening by means of the housing 15, waterproof material coming in contact with waterproof material at this point, and dust will be prevented from finding access to the interior of the device by means of the faces 19 and 20 of dust-stopping material coming into engagement.

A suitable handle 21 may be provided for turning the closure upon its pivot 14. Catches 22, 23, may be provided for holding the closure shut or for locking the same, as occasion may demand.

In the present illustration but one form of our invention is shown and described, but we do not purpose limiting ourselves thereto, since changes can be made without departing from the spirit of the invention.

Having thus described our invention, what we claim and desire to secure by Letters Patent is:

1. In a tire trunk, the combination with a cylindrical body of a circular head secured at its periphery to the cylindrical body and provided in its upper portion with a segmental opening having its curved edge spaced from and concentric with the periphery of the circular head leaving a relatively broad integral arcuate top portion, an annular binding strip having angularly related flanges embracing the cylindrical body and overlapping the peripheral portion of the said head, an arcuate housing and guiding strip angularly bent in a longitudinal direction to form a flat outer attaching flange and an inner offset guiding flange, the attaching flange being fitted flat against and secured to the said arcuate integral portion of the circular head between the side edges thereof, and the inner guiding flange being arranged in spaced relation with the inner portion of the said integral arcuate portion of the head and forming therewith a guiding groove located at the curved edge of the said portion, and a substantially segmental closure pivoted to the center of the head beyond the opening thereof and having its peripheral edge guided in the said groove.

2. In a tire trunk, the combination with a cylindrical body of a circular head secured at its periphery to the cylindrical body and provided in its upper portion with a segmental opening having its curved edge spaced from and concentric with the periphery of the circular head leaving a relatively broad integral arcuate top portion, an annular binding strip having angularly related flanges embracing the cylindrical body and overlapping the peripheral portion of the said head, an arcuate housing and guiding strip angularly bent in a longitudinal direction to form a flat outer attaching flange and an inner offset guiding flange, the attaching flange being fitted flat against and secured to the said arcuate integral portion of the circular head between the side edges thereof, and the inner guiding flange being arranged in spaced relation with the inner portion of the said integral arcuate portion of the head and forming therewith a guiding groove located at the curved edge of the said portion, and a substantially segmental closure pivoted to the center of the head beyond the opening thereof and having its peripheral edge guided in the said groove, a sheet of water proof material covering the outer face of the closure, and a sheet of water proof material having its outer portion fitted against the integral arcuate portion of the head adjacent to the periphery thereof and extending under the annular binding strip, the inner portion of the said water proof strip overlying the exterior of the guiding and housing strip and extending around the inner edge of the guiding flange and over the inner face thereof to fit against the peripheral portion of the closure when the latter is in its closed position.

In witness whereof we have hereunto set our hands in the presence of two subscribing witnesses.

ABRAHAM ZIEVE.
HARRY DAVIDOVITZ.

Witnesses:
CHAS. LYON RUSSELL,
ISADORE BERNSTEIN.